United States Patent [19]

Kunz

[11] Patent Number: 4,705,127

[45] Date of Patent: Nov. 10, 1987

[54] CAPACITY-TYPE POSITION SENSOR FOR ELECTROMAGNETIC LOAD-COMPENSATION WEIGHING APPARATUS

[76] Inventor: Peter Kunz, Saumstrasse 28, CH-8625 Gossau, Switzerland

[21] Appl. No.: 25,584

[22] Filed: Mar. 13, 1987

[30] Foreign Application Priority Data

Apr. 15, 1986 [CH] Switzerland ............... 1493/86

[51] Int. Cl.$^4$ ............... G01G 7/00; G01G 3/14
[52] U.S. Cl. ............... 177/212; 177/210 C
[58] Field of Search ............... 177/212, 210 C

[56] References Cited

U.S. PATENT DOCUMENTS

| | | |
|---|---|---|
| 3,133,606 | 5/1964 | Thomson . |
| 3,604,525 | 9/1971 | Blethen et al. . |
| 3,680,650 | 8/1972 | Zimmerer ............... 177/210 C |
| 3,685,604 | 8/1972 | Smith et al. . |
| 3,786,678 | 1/1974 | Kunz . |
| 3,789,937 | 2/1974 | Strobel et al. . |
| 3,986,571 | 10/1976 | Strobel et al. . |
| 4,062,417 | 12/1977 | Kunz . |
| 4,090,575 | 5/1978 | Kunz et al. . |
| 4,099,587 | 7/1978 | Kaufmann . |
| 4,170,269 | 10/1979 | Kunz . |
| 4,429,757 | 2/1984 | Kunz . |

*Primary Examiner*—George H. Miller, Jr.
*Attorney, Agent, or Firm*—Laubscher & Laubscher

[57] ABSTRACT

The position of the movable member relative to the stationary member of weighing apparatus of the electromagnetic load-compensation type is sensed by a variable-capacity alternating-current bridge network, use being made of two pairs of coplanar capacitive plate electrodes arranged in successively spaced opposed relation between planar parallel electrically-grounded surfaces of the movable and stationary members of the weighing apparatus. Opposed electrodes of each pair are connected in the bridge network to define two capacitive voltage dividers across the center points of which is developed an electrical signal corresponding with the deviation of the movable member from its zero position.

The position sensor is manufactured in a simple manner and affords precise operation. All of the circuit connections are to fixed plate-type capacitive electrodes that may be mounted on a carrier member immediately adjacent the other electronic equipment.

8 Claims, 9 Drawing Figures

CAPACITY-TYPE POSITION SENSOR FOR ELECTROMAGNETIC LOAD-COMPENSATION WEIGHING APPARATUS

BRIEF DESCRIPTION OF THE PRIOR ART

This invention relates to variable-capacity position sensing means for use in a weighing apparatus of the electromagnetic load-compensation type.

It is known in the weighing scale art to provide load-compensation means for displacing a movable load-responsive member toward a zero or equilibrium position relative to a stationary member, the magnitude of the compensation current being a measure of the applied load. Examples of such weighing systems are presented by the U.S. Pat. Nos. 3,786,678, 4,062,417, 4,090,575, 4,170,269 and 4,429,757, Strobel et al U.S. Pat. Nos. 3,789,937, 3,986,571 and Kaufmann U.S. Pat. No. 4,099,587, among others.

It is further known, as evidenced by the Thomson U.S. Pat. No. 3,133,606, Blethen et al U.S. Pat. No. 3,604,525 and Smith et al U.S. Pat. No. 3,685,604, to provide variable capacity position sensors in electromagnetic load-compensation weighing systems. The sensor means of these known systems operates as a differential capacitor arrangement wherein the capacity ratio or the capacity difference forms a measure of the position of a load-responsive movable scale member relative to a fixed scale part (such as the stationary frame). When the scale is in the zero position or in a balanced state, the capacity ratio is equal to one, or the capacity difference is equal to zero. In case of any deviation from the zero position, the compensation current of the scale is readjusted, on the basis of the attendant capacity change, until the zero position has been regained.

To determine the capacity change, one can use, for example, an alternating-current bridge with a phase-selective rectifier in the neutral branch (as shown, for example, in the aforementioned Thomson U.S. Pat. No. 3,133,606). Together with two fixed capacitors, the differential capacitor can form a complete bridge circuit (as shown by the to Blethen et al U.S. Pat. No. 3,604,525); this offers the advantage that the two outside electrodes of the differential capacitors lie at the same potential, preferably at ground potential, and can be formed by parts of the movable scale part (for example, a metallic scale beam, as shown by the Smith et al U.S. Pat. No. 3,685,604); as a result of this, the normal connections to the outside electrodes attached in an insulated manner are avoided.

The designs of capacitive position sensors of the type mentioned above, which include, in known manner, a differential capacitor with external electrodes located on the scale beam and acting as a sensor element, however present various disadvantages in terms of their mechanical and electrical properties.

One disadvantage arises from the fact that the movable outside electrodes of the differential capacitor quite naturally spatially grip the stationary inside electrodes of the capacitor which are insulated against each other. It is therefore practically inevitable that one must construct the movable part of the position sensor in such a manner that it will consist of several parts; this makes the assembly and disassembly of the scale beam on the stand of the scale more difficult and necessitates an additional operation for the mounting of the outside electrodes on the scale beam.

To protect the scale against overload—especially to prevent any overstressing of the flexible bearings in scales equipped with them—there are usually provided certain stops which limit the movement of the scale beam on both sides. Until then it was necessary to make these stops in an adjustable manner because the zero position of the scale beam may be located at varying heights with relation to the stand of the scale within a particular product series, from one scale to the next, in which case the stops must be adjusted in each scale. This disadvantage can be traced back, on the one hand, to the fact that, during the manufacture and assembly of the position sensor, partly owing to the composite structure thereof, deviations are encountered of the individual capacities from their nominal values. On the other hand, the electrical connections between the differential condenser and the analyzing electronics, normally arranged separately from the latter, can form stray capacities with an effect on the bridge balance that will vary from one scale to the next.

Furthermore, the antenna effect can cause high-frequency interference signals to get into the analyzing circuit if these connections are not suitably screened.

The present invention is intended to create a capacitive position sensor means which will facilitate a simpler mechanical structure and a more precise operating method, thereby avoiding the above and other disadvantages.

SUMMARY OF THE INVENTION

Accordingly, a primary object of the present invention is to provide an improved weighing apparatus of the electromagnetic load-compensation type in which the movable load-responsive member and the stationary frame member are provided with spaced parallel surfaces that define a pair of electrodes, the position sensing means being of the capacity bridge type including two pairs of coplanar spaced plate-type capacitive electrodes mounted in successively spaced opposed parallel relation between said movable and stationary electrodes, respectively, a first electrode of one pair defining a first capacity relative to the movable electrode and a third capacity relative to the opposed second electrode of the other pair, whereby the first and third capacities define a first capacitive voltage divider. The remaining electrode of the other pair defines a third electrode which defines a second capacity relative to the stationary electrode, and a fourth capacity relative to the opposed fourth electrode, whereby the second and fourth capacities define a second capacitive voltage divider. These voltage dividers are connected across an alternating current voltage source to define a bridge network, the center points of the voltage dividers being operable to supply the position-sensing electrical signal corresponding with the displacement of the movable scale member from its zero position.

The position detector according to the present invention works, like known designs, with four capacitors connected in a bridge circuit. Out of these four capacitors, however, only one is variable, in contrast to the prior arrangements with a differential condenser which includes two capacitors which are varied in opposite directions. The sensitivity loss, which must be accepted as a result of this simplification, can be compensated for without any problem by means of a corresponding signal amplification. The attendant advantage, however, consists in the fact that only a single movable surface electrode is present and it can be formed in a simple manner by a surface element on the scale beam. The movable scale electrode is arranged at the outside of the capacitor arrangement so that a correspondingly designed scale beam can be mounted and removed without obstruction by the fixed surface electrodes. No additional structural components or attachment parts are required for the movable part of the position sensor, whereby any pertinent assembly operation is eliminated also. Moreover, the movable part of the position sensor—in contrast to the one in a differential capacitor—does not require any additional motion space, as a result of which the position sensor may be given a lower structural height.

All of the connections of the sensor which relate to the circuit as such are with fixed surface electrodes so that there are no movable electrical connections. The internal four surface electrodes are preferably formed as electrically conducting coatings on opposite sides of a plate-like circuit carrier which is mounted in spaced relation on the stationary scale member. The outer fixed surface electrode can in a simple manner be a surface element of the scale stand, i.e. an element which is recessed with respect to the assembly plane of the circuit carrier. In this manner the need for any additional structural parts for the assembly of the circuit carrier, except for the fastening elements (for example, screws), is eliminated.

It is advantageous, on the plate-like circuit carrier, to put at least that part of the electronic circuit arrangement of the scale which encompasses the circuit means for determining the capacity change and for generating an error signal characterizing the deviation from the zero position. In this way, one can keep the electrical connections from the fixed surface electrodes to the above-mentioned switching means very short, as a result of which the sensitivity of the entire measurement setup against external interference signals is considerably reduced. The electronic circuit setup can be made in the form of a printed circuit, thus making it possible to integrate the position detector in the circuit setup in a simple manner and this in turn results in a further simplification in the manufacture of the detector.

A position detector with the structural characteristics described here can be made in a more precise fashion and can be mounted in a simpler manner when compared to past solutions. This is why, with regard to the zero position of the scale beam, one can expect only very minor deviations from one scale to the next within a particular product series. Under these circumstances, there is no need for any adjustment of the bar stops—that is to say, fixed stops may be provided. The number of structural components needed for the construction of the position sensor and installation is comparatively small, and this implies a reduced expenditure in terms of production, storage, assembly, and servicing.

BRIEF DESCRIPTION OF THE DRAWINGS

Other objects and advantages of the invention will become apparent from a study of the following specification, when viewed in the light of the accompanying drawing, in which.

DETAILED DESCRIPTION

Figure 1:
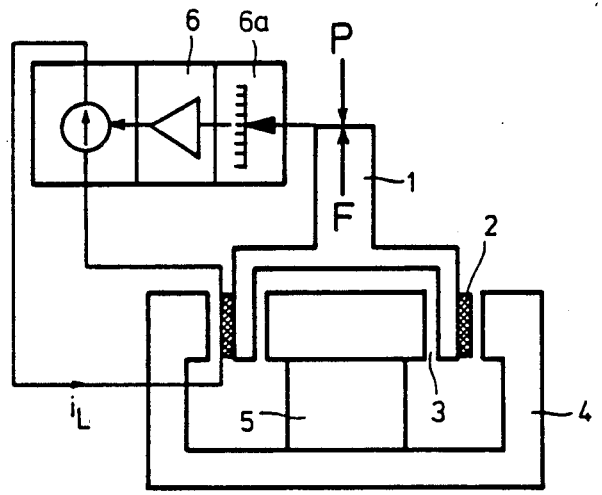
FIG. 1 is a schematic diagram of a basic weighing system of the electromagnetic load-compensation type.

Referring first, more particularly to FIG. 1, the weighing apparatus includes a load receiver 1 to which a force P is applied corresponding to the weight of the object to be weighed. Load receiver 1 carries a coil 2 which is arranged in the air gap 3 of a permanent magnet system 4 including a permanent magnet 5. Through the load winding of coil 2 flows a compensation current $i_L$ which, in the magnetic field of permanent magnet system 4, generates a force F in opposition to the weighing force P. By means of a regulating device 6, which includes a position detector 6a for determining the position of the load receiver 1 relative to the stationary scale frame, the compensation current $i_L$ is so regulated that the force F, which is proportional to it, maintains the scale in balance and so that the magnitude of the compensation current $i_L$ represents a measure of the force P, or of the weight of the object to be weighed.

Figure 2:
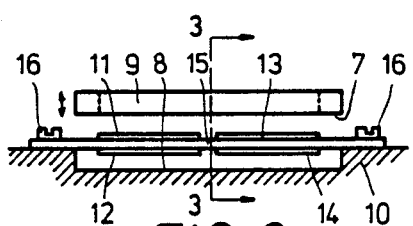
FIG. 2 is an end view of a first embodiment of variable capacitance position sensing means suitable for use with the weighing system of FIG. 1.
Figure 3:
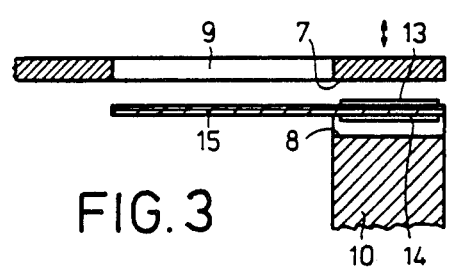
FIG. 3 is a sectional view taken along line 3—3 of FIG. 2.

The variable capacitance type position sensing means according to FIGS. 2 and 3 includes a movable electrode 7, a fixed electrode 8 which is located in opposed spaced relation. The movable electrode 7 is defined by a surface element of a structural load-responsive part of the scale—i.e., the movable platform 9—that is displaced relative to the frame owing to the effect of the applied load, while the fixed electrode 8 is defined by a surface element of a fixed structural part of the scale, for example, the support frame or stand 10. Both electrodes 7 and 8 are capacitance-type plate electrodes normally at ground potential, which is the case when the structural components of the scale are made of metal. Between the above-mentioned two electrodes 7 and 8 are arranged four additional stationary capacitance electrodes 11, 12, 13 and 14 which are arranged in adjacent pairs and which are in the form of electrically-conducting coatings carried by opposite sides of a plate-like circuit carrier 15. The circuit carrier 15, which serves as a dielectric between the plate electrodes 11 and 12 and between electrodes 13 and 14, respectively, is so mounted on support 10 by means of screws 16 that, in the area of the surface electrodes, the carrier is in spaced relation relative to the stand 10.

Figure 4:
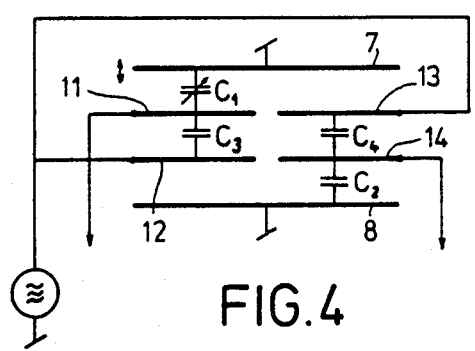
FIG. 4 is an illustrative electrical circuit diagram of the variable capacitance position sensing means of FIGS. 2 and 3.

Referring to FIG. 4, the internal four plate electrodes 11, 12, 13 and 14, are arranged to define two pairs of coplanar capacitors arranged in parallel spaced relation between the outer electrodes. The two capacitors $C_1$ and $C_3$ defined between electrode 11 and movable surface electrode 7, and between electrode 11 and electrode 12, respectively, and the two capacitors $C_4$ and $C_2$ defined between electrode 14 and electrode 13, and between electrode 14 and outer fixed surface electrode 8, respectively, form capacitive voltage dividers, only condenser $C_1$ having a variable capacity (specifically, a capacity that varies in accordance with the position of the movable scale platform or beam 9 relative to the stationary circuit carrier 15).

Figure 5:
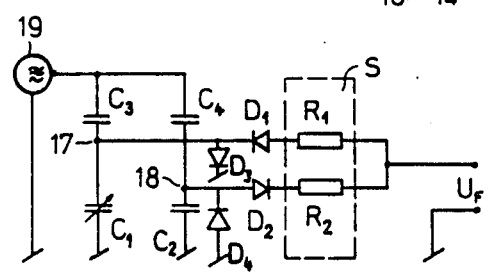
FIG. 5 is an electrical circuit diagram of a system operable to generate an error signal using the position sensing means of FIGS. 2 and 3.

As shown in FIG. 5, the two capacitive voltage dividers $C_1$, $C_3$, and $C_2$, $C_4$ are connected to form a bridge circuit connected across a common alternating-current voltage source 19 (for example, a simple high-frequency oscillator, or a clock generator included in the electronic circuitry of the weighing apparatus). As a standard or reference value for determining the position deviation of the weighing beam 9 from the zero position, use is made of the difference of the voltages, relative to the reference potential at the centers 17 and 18 of both voltage dividers. These centers 17 and 18 are connected with oppositely poled diodes $D_1$, $D_3$, and $D_2$, $D_4$ respectively, the outputs of which are connected with a summing circuit S including a pair of resistances $R_1$ and $R_2$, which summing circuit supplies the error signal $U_F$ for regulating the magnitude of the compensation current $i_L$ of the weighing system.

Figure 6:
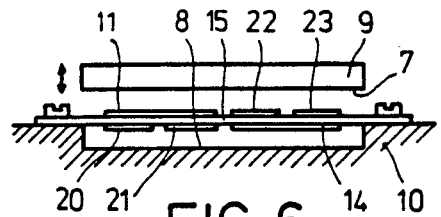
FIG. 6 is an end view of a second embodiment of the variable capacitance position sensing means of the present invention.

The capacitive position sensor according to FIG. 6 is basically structured in the same way as the one according to FIGS. 2 and 3, the major difference residing in that the plate electrodes 12 and 13 of the previous embodiment are replaced by two pairs of adjacent plate electrodes 20 and 21, and 22 and 23, respectively, and that the plate electrodes 21 and 22 are internally connected with each other. Two capacitive voltage dividers are now formed, according to FIG. 7, by capacitors $C_1$ and $C_{11}$ and by $C_2$ and $C_{21}$, respectively, while the centers 17 and 18 of both voltage dividers, according to FIG. 8, are connected with each other by a third capacitive voltage divider defined by capacitors $C_{12}$, $C_{22}$ forming a capacitive summing circuit. The alternating-current voltage source is connected with the contacts A and C respectively of FIG. 7 with a phase lag of 180°, while contact B connects center point 26 of the third voltage divider with a phase-selective rectifier circuit of an analyzing circuit 24 which supplies the error signal $U_F$ for the regulation compensation current $i_L$ of the weighing system.

The summing of the voltages at the centers 17, 18 of both voltage dividers $C_1$, $C_{11}$ and $C_2$, $C_{21}$ in this version is effected not on the direct-current voltage side but rather on the alternating-current side. This results in the elimination of the four diodes $D_1$, $D_3$, $D_2$, $D_4$ of FIG. 5 whose temperature synchronization is more difficult to accomplish than that of two fixed capacitors.

Figure 7:
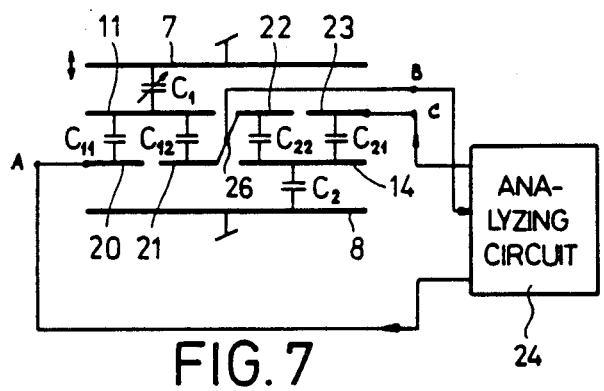
FIG. 7 is an electrical circuit diagram of the apparatus of FIG. 6.
Figure 8:
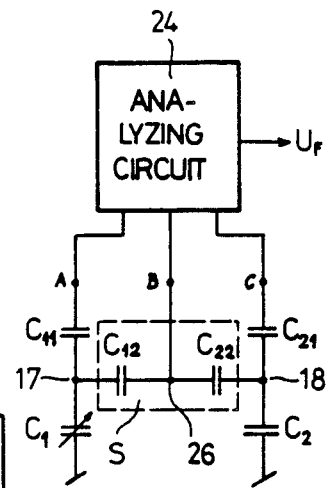
FIG. 8 is a detailed electrical schematic diagram illustrating the connection of the position sensing circuit of FIG. 6 with the analyzing means for generating the error signal.
Figure 9:
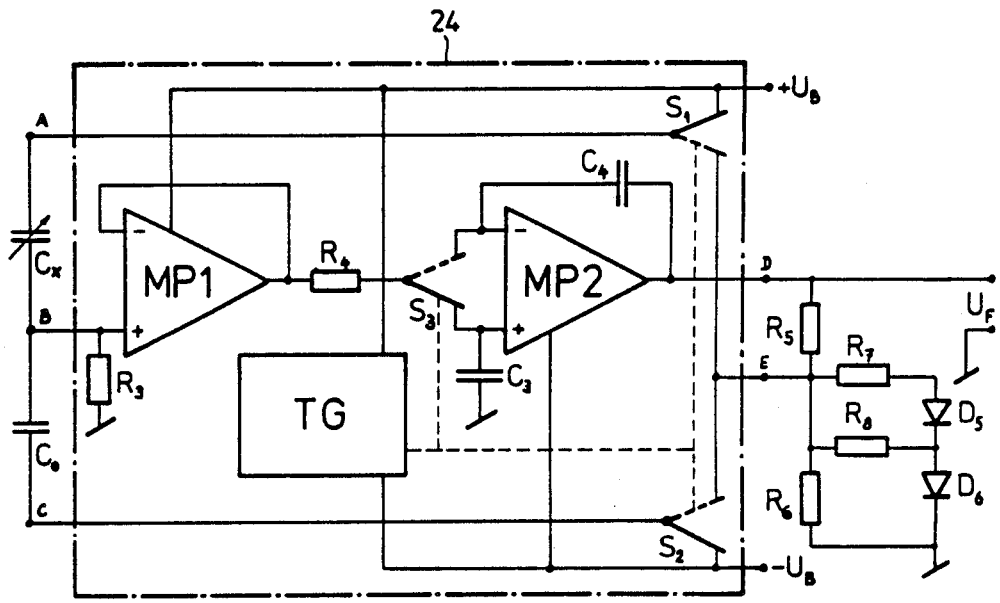
FIG. 9 is an electrical schematic diagram illustrating the analyzing circuit of FIG. 8.

A practical version of the circuit of the position sensor according to FIG. 7, in combination with an analyzing device for the generation of the error signal $U_F$, is illustrated in FIGS. 8 and 9. FIG. 8 shows the connection of the bridge circuit, defined by the capacitors of the position sensor with the analyzing device 24, while FIG. 9 illustrates the details of the analyzing circuit 24. In FIG. 9, the condenser-bridge circuit, with contacts A and B and C, is replaced in a simple manner by a condenser $C_X$ of variable capacity between contacts A and B and a condenser $C_O$ of fixed capacity between contacts B and C.

To operate the analyzing circuit 24, use is made of two direct-current voltages $+U_B$ and $-U_B$ that are symmetrical relative to ground. To supply the condensers $C_X$ and $C_O$, these direct-current voltages are chopped by two periodically activated electronic switches $S_1$ and $S_2$. The voltage at center B of the capacitor arrangement is supplied to a first operational amplifier MP1 which works as impedance converter with a high input resistance and whose operating point is determined by the resistance $R_3$ at its noninverted input. The phase-selective rectifier circuit comprises a second operational amplifier MP2, which is connected with capacitors $C_3$ and $C_4$ as a double integrator, and a third electronic switch $S_3$ that alternately supplies to the two inputs of the second operational amplifier MP2 the output signal from operational amplifier MP1 supplied via resistor $R_4$. The control signal inputs of all three switches $S_1$, $S_2$, and $S_3$ are connected with a common timing device TG having a given clock frequency (for example, 30 kHz). At the output of the operational amplifier MP2 originates the error signal $U_F$ in the form of a direct voltage which, for example, is negative when $C_X$ is less than $C_O$, and which is positive when $C_X$ is greater than $C_O$. The attainable absolute magnitude of the error signal $U_F$ as a function of the change of the capacity ratio $C_X/C_O$ depends on the degree of feedback which is achieved through the connection between the contact points D and E at the output of the analyzing circuit 24. In the illustrated embodiment, a part of the error signal $U_F$ is fed back via the voltage divider $R_5$, $R_6$. A stronger feedback, for example, a direct connection between the contact points D and E, reduces the error signal $U_F$, and vice versa.

The extent of the voltage change at the output of the analyzing circuit 24 as a function of a deviation of the position of the beam 9 from the zero position depends on the direction in which the position deviation takes place, that is to say, whether the distance between the surface electrodes of condenser $C_X$ is reduced or increased. If the electrode distance increases, the error voltage $U_F$ increases comparatively more slowly than in the case of a corresponding reduction in that distance. To achieve identical voltage development and thus also, in regulating the compensation current $i_L$, to attain the same regulating speed in case of positive and negative position deviations, there is provided, in the previously mentioned feedback branch, a non-linear network that depends on the polarity of the error voltage $U_F$ and which, in the illustrated example, is connected with contact point E and consists of the diodes $D_5$ and $D_6$ and the resistances $R_7$ and $R_8$.

On the planar circuit carrier 15 (FIG. 3), preferably there is placed, next to the surface electrodes 11, 12, 13, and 14, at least that part of the electronic equipment of the weighing apparatus which belongs to the position detector, in other words, the part that comprises the circuit means for the determination of the capacity change and for the generation of the error signal corresponding with the deviation from the zero position. A solution that is particularly favorable in electrical terms consists in arranging the entire regulating device 6 (FIG. 1) of the weighing apparatus on the same circuit carrier 15. In this way one can further reduce the previously mentioned error sources which exist as a result of the otherwise present intermediate lines.

What is claimed is:

1. In a weighing apparatus of the electromagnetic load-compensation type operable to bias a movable load-responsive member (9) toward a zero position relative to a stationary frame member (10), said movable and stationary members defining a pair of parallel spaced planar electrodes (7,8) each at ground potential; the improvement which comprises: variable-capacitance position sensing means for generating a position-responsive electrical signal that is a function of the displacement of the movable member from its normal zero position, including:
- (a) at least two pairs of coplanar spaced capacitive electrodes (11, 13,; 12, 14) mounted in successively spaced opposed parallel relation between said movable and stationary electrodes, respectively, a first electrode (11) of one pair defining a first capacity ($C_1$) relative to the movable electrode and a third capacity ($C_3$) relative to the opposed second electrode (12) of the other pair, whereby said first and third capacities define a first capacitive voltage divider, the remaining electrode (14) of said other pair constituting a third electrode defining a second capacity ($C_2$) relative to the stationary electrode, and a fourth capacity ($C_4$) relative to the opposed fourth electrode, whereby said second and fourth capacities define a second capacitive voltage divider;
- (b) means connecting said second and fourth electrodes with one terminal of an alternating-current voltage source (19), the other terminal of said source being connected with ground, whereby said first and second capacitive voltage dividers are connected to define a capacitive bridge network; and
- (c) output means connected with said first and third electrodes and thus with the center points (17, 18) of said capacitive voltage dividers for supplying said position-responsive signal.

2. Apparatus as defined in claim 1, wherein said output means includes:
- (1) summing circuit means (S) including a pair of summing resistors ($R_1$, $R_2$) connected at one end to define one output terminal, the other output terminal comprising ground; and
- (2) two pairs of oppositely-poled rectifiers ($D_1$, $D_3$, $D_2$, $D_4$) connecting the other ends of said summing resistors with said voltage divider center points, respectively;

and further including:
- (d) regulating means (6a) responsive to the error signal ($U_F$) across said output terminals for regulating the magnitude of the compensation current ($i_L$) of the weighing apparatus.

3. Apparatus as defined in claim 1 and further including
- (d) third capacitive voltage divider means ($C_{12}$, $C_{22}$) connected across the center points (17, 18) of said first and second voltage divider means; and
- (e) phase-sensitive rectifier means (24) having an input connected with the center point (26) of said third voltage divider means, and an output for supplying the error signal ($U_F$) for regulating the magnitude of the compensation current ($i_L$) of the weighing apparatus.

4. Apparatus as defined in claim 3, wherein said phase-sensitive rectifier means includes an operational amplifier (MP2) connected as a double integrator; wherein said alternating-current voltage source includes a pair of selector switches (S1, S2) operable to chop power supplied from a direct-current voltage source ($+U_B$, $-U_B$); and further including an additional selector switch (S3) for supplying alternately to the two inputs of said operational amplifier the position-responsive signal supplied by said bridge means, and timing means (TG) for controlling the operation of said selector switches.

5. Apparatus as defined in claim 4, and further including polarity-responsive correction means ($D_5$, $D_6$, $R_7$, $R_8$) for correcting the inequalities in the error signal produced by positive and negative position deviations of the load-receiving member from its no-load position.

6. Apparatus as defined in claim 1, and further including
- (d) a planar carrier member (15) mounted in parallel spaced relation between the electrode surfaces (7, 8) of said movable and stationary members, said first and second electrodes and said third and fourth electrodes comprising electrically conductive coatings mounted on opposite sides of said carrier member.

7. Apparatus as defined in claim 6, and further including third capacitive voltage divider means ($C_{12}$, $C_{22}$) connected between the center points of said first and second capacitive voltage divider means, said third voltage divider means including fifth (21) and sixth (22) electrodes defined by electrically conductive coatings mounted on opposite sides of said carrier member.

8. Apparatus as defined in claim 6, and further including
- (e) means including a timing device (TG) and switching means (S1, S2, S3) for generating an error signal ($U_F$) as a function of said position-responsive signal, said means being also mounted on said carrier member.

* * * * *

UNITED STATES PATENT AND TRADEMARK OFFICE
CERTIFICATE OF CORRECTION

PATENT NO. : 4,705,127
DATED : November 10, 1987
INVENTOR(S) : Peter Kunz

It is certified that error appears in the above—identified patent and that said Letters Patent is hereby corrected as shown below:

In the Heading, add:

Assignee: Mettler Instrumente AG
                   Greifensee, Switzerland

Signed and Sealed this

Twenty-fourth Day of May, 1988

*Attest:*

DONALD J. QUIGG

*Attesting Officer*      *Commissioner of Patents and Trademarks*